Figure 1:
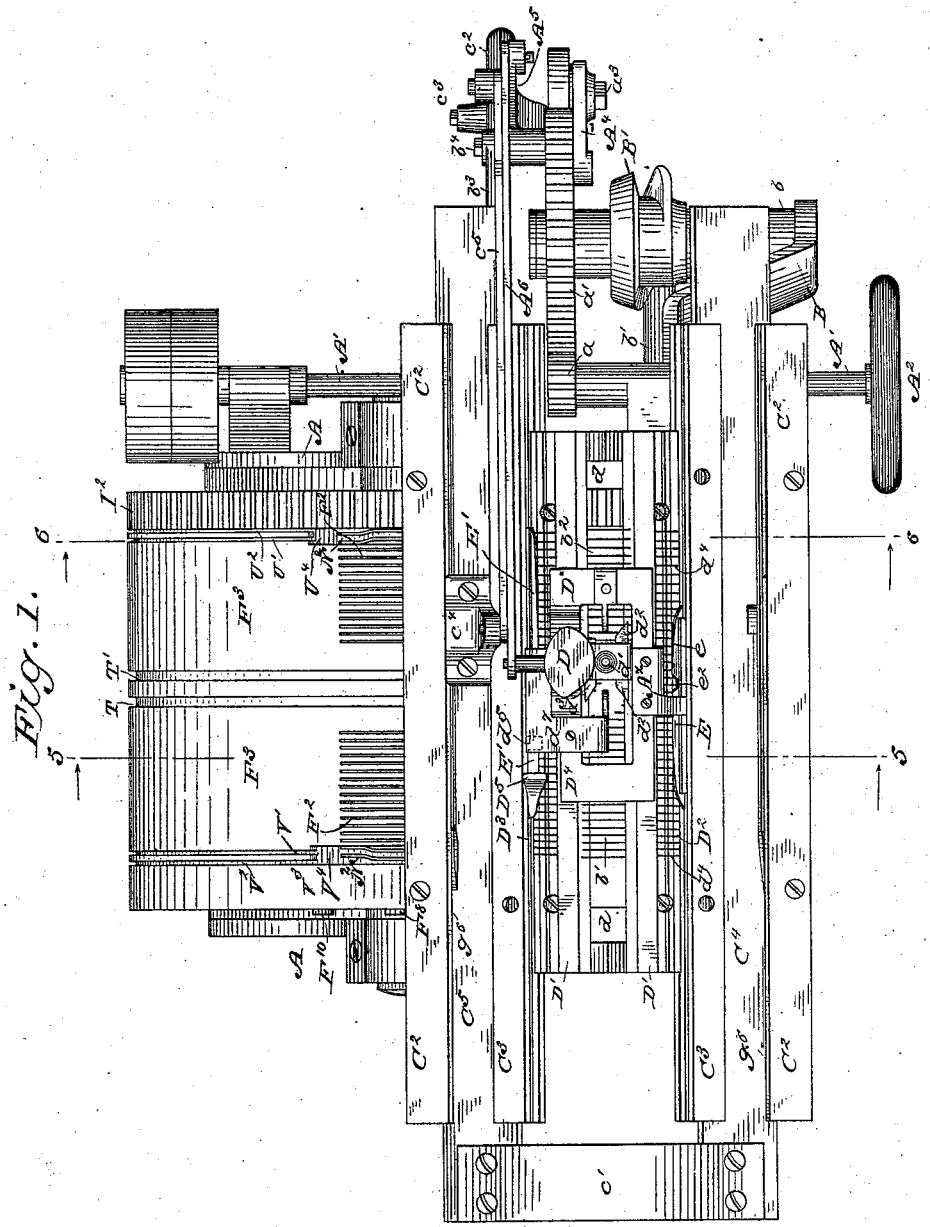

(No Model.) 11 Sheets—Sheet 1.
J. NELSON, Dec'd.
A. NELSON, Administrator. W. NELSON, present Administrator, succeeding prior Administrator.
STRAIGHT KNITTING MACHINE.
No. 576,881. Patented Feb. 9, 1897.

WITNESSES
Ed. A. Newman.
Al. C. Newman.

By his Attorneys
Baldwin Hopkins & Peyton

Alfred Nelson,
ADM'R OF
John Nelson,
Inventor:

(No Model.) 11 Sheets—Sheet 2.

J. NELSON, Dec'd.
A. NELSON, Administrator. W. NELSON, present Administrator, succeeding prior Administrator.
STRAIGHT KNITTING MACHINE.

No. 576,881. Patented Feb. 9, 1897.

WITNESSES
Ed. A. Newman,
Al. C. Newman,

By his Attorneys
Baldwin Hopkins & Peyton

Alfred Nelson,
ADM'R OF
John Nelson,
Inventor.

(No Model.) 11 Sheets—Sheet 3.

J. NELSON, Dec'd.

A. NELSON, Administrator. W. NELSON, present Administrator, succeeding prior Administrator.

STRAIGHT KNITTING MACHINE.

No. 576,881. Patented Feb. 9, 1897.

Fig. 3.

WITNESSES
Ed. A. Newman.
Al. C. Newman.

By his Attorneys

Alfred Nelson,
ADM'R
John Nelson,
Inventor.

Baldwin Hopkins & Peyton (No Model.) 11 Sheets—Sheet 4.
J. NELSON, Dec'd.
A. NELSON, Administrator.- W. NELSON, present Administrator, succeeding prior Administrator.
STRAIGHT KNITTING MACHINE.
No. 576,881. Patented Feb. 9, 1897.
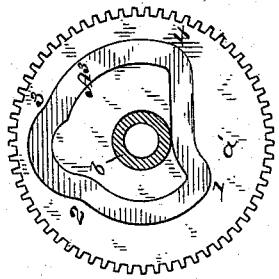
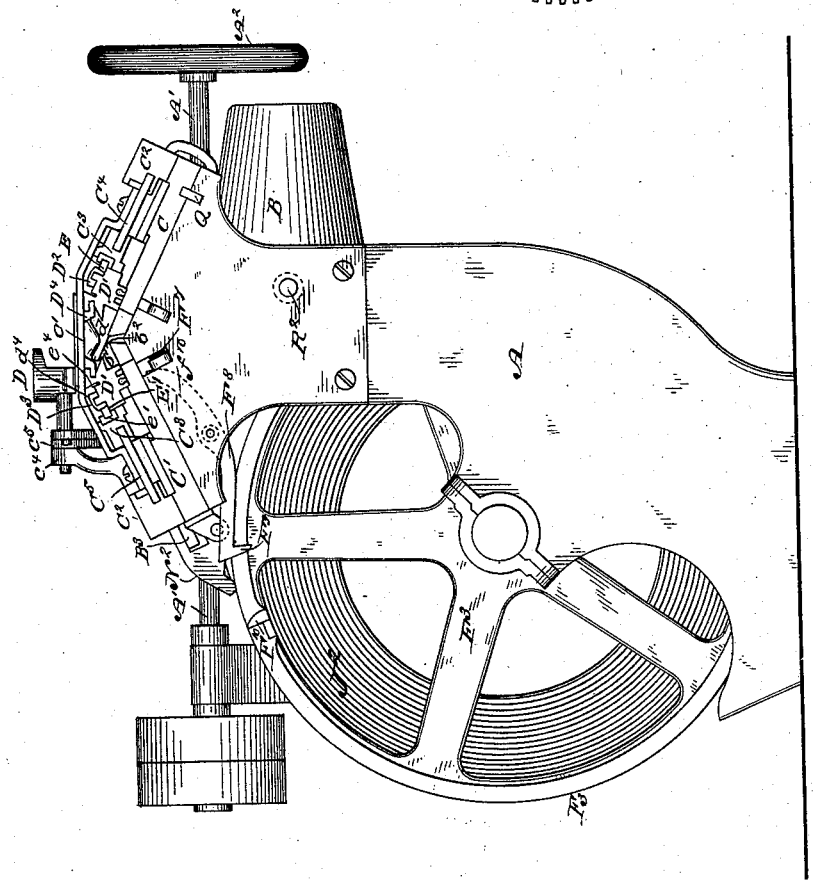
WITNESSES
Ed. A. Newman.
Al. C. Newman,
Alfred Nelson,
ADM'R OF
John Nelson,
Inventor:
By his Attorneys
Baldwin Hopkins & Peyton (No Model.) 11 Sheets—Sheet 5.
J. NELSON, Dec'd.
A. NELSON, Administrator. W. NELSON, present Administrator, succeeding prior Administrator.
STRAIGHT KNITTING MACHINE.
No. 576,881. Patented Feb. 9, 1897.
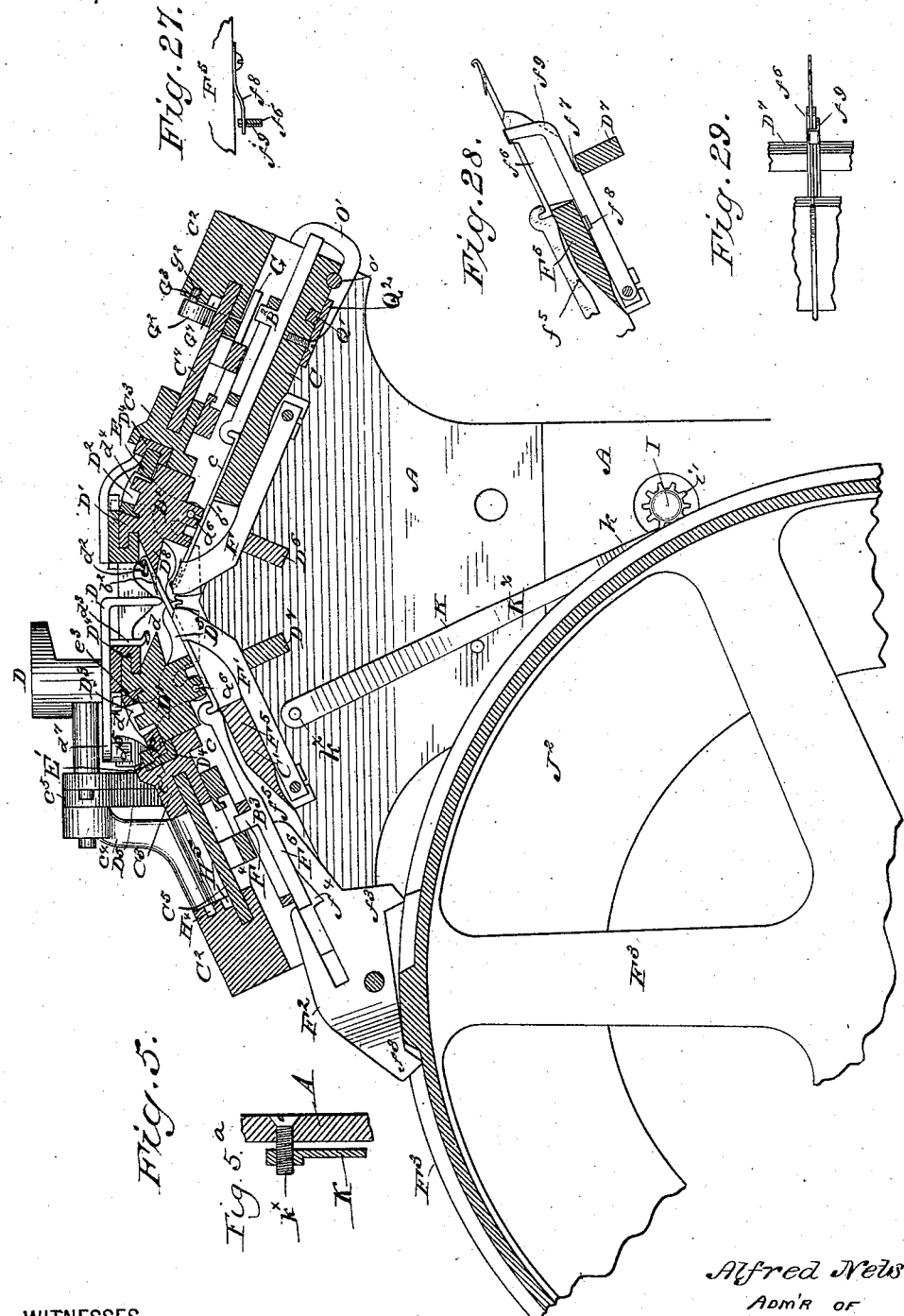
WITNESSES
Ed. A. Newman.
Al. C. Newman.
By his Attorneys
Baldwin Hopkins & Peyton
Alfred Nelson
Adm'r of
John Nelson,
Inventor.
THE NORRIS PETERS CO., PHOTO-LITHO., WASHINGTON, D.C.

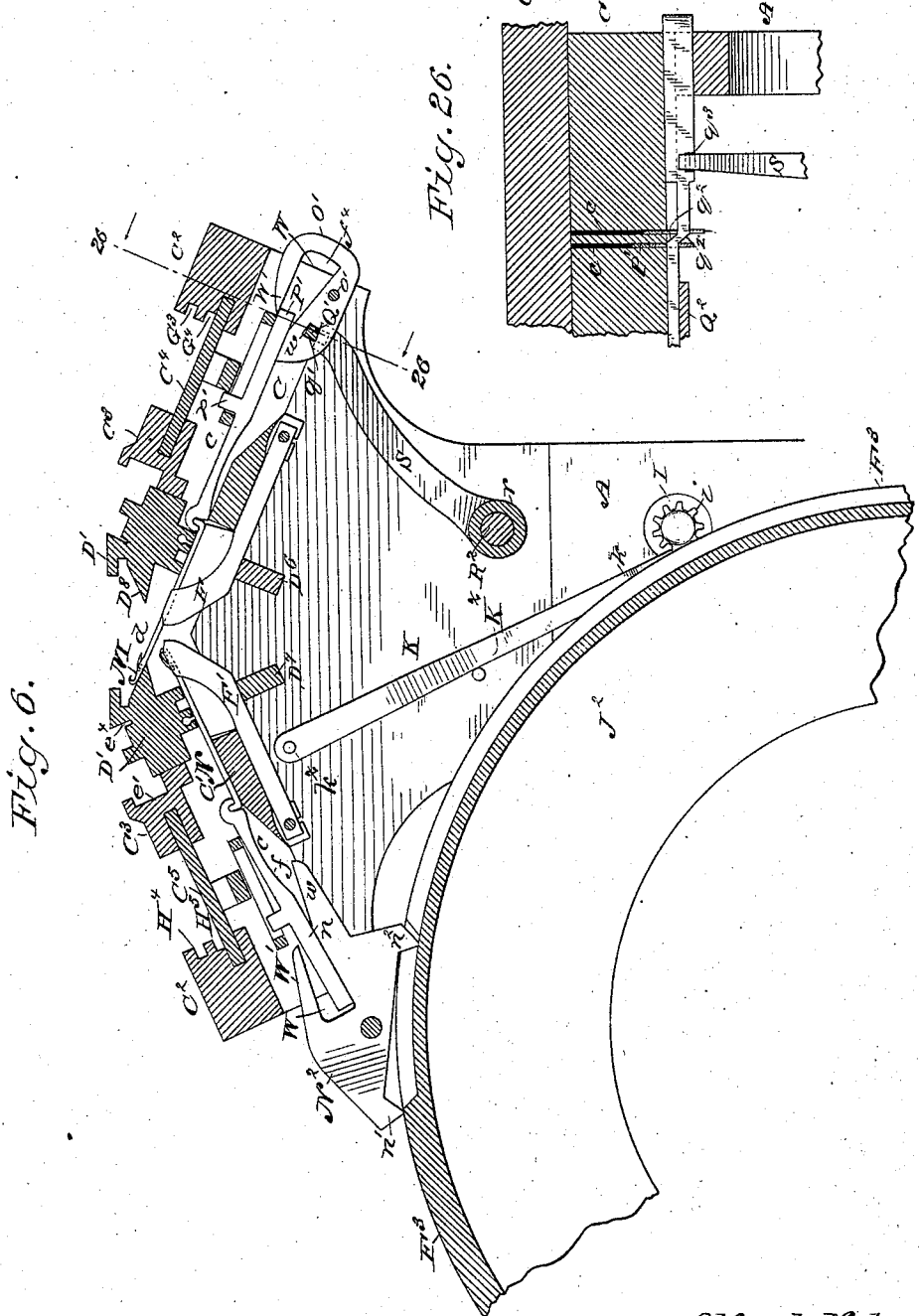

(No Model.) 11 Sheets—Sheet 7.
J. NELSON, Dec'd.
A. NELSON, Administrator.  W. NELSON, present Administrator, succeeding prior Administrator.
STRAIGHT KNITTING MACHINE.
No. 576,881. Patented Feb. 9, 1897.
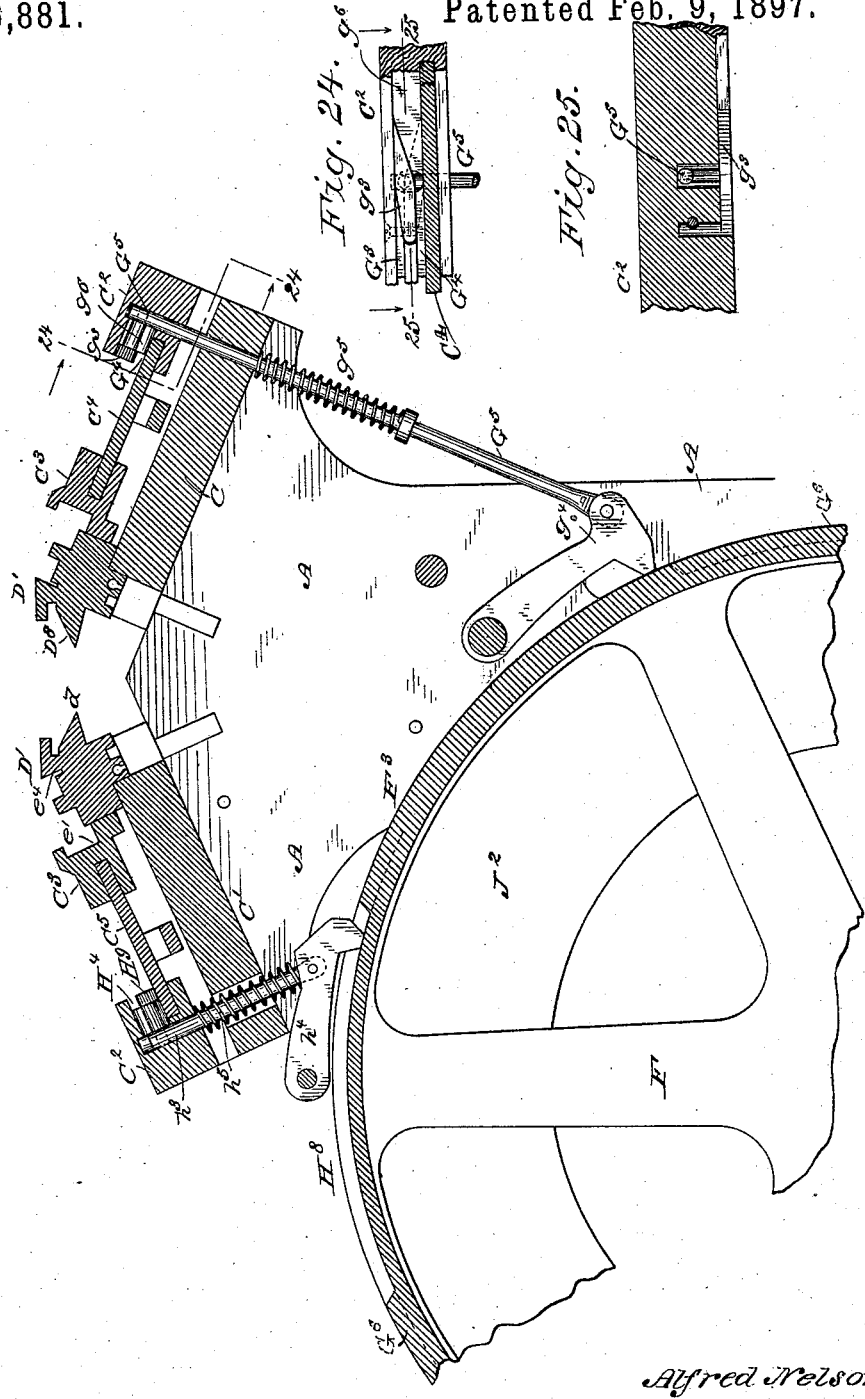
WITNESSES
Ed. A. Newman
Al. C. Newman
By his Attorneys
Baldwin Hopkins & Peyton
Alfred Nelson,
Adm'r of
John Nelson,
Inventor (No Model.) 11 Sheets—Sheet 8.
J. NELSON, Dec'd.
A. NELSON, Administrator. W. NELSON, present Administrator, succeeding prior Administrator.
STRAIGHT KNITTING MACHINE.
No. 576,881. Patented Feb. 9, 1897.
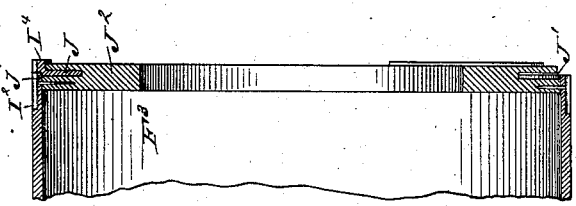
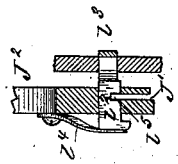
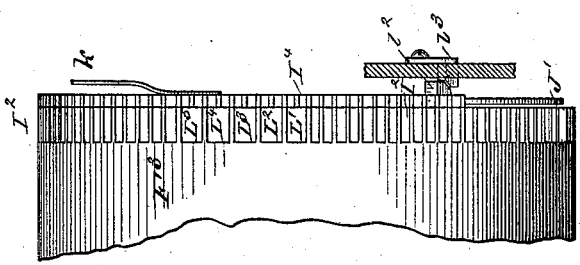
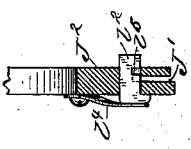
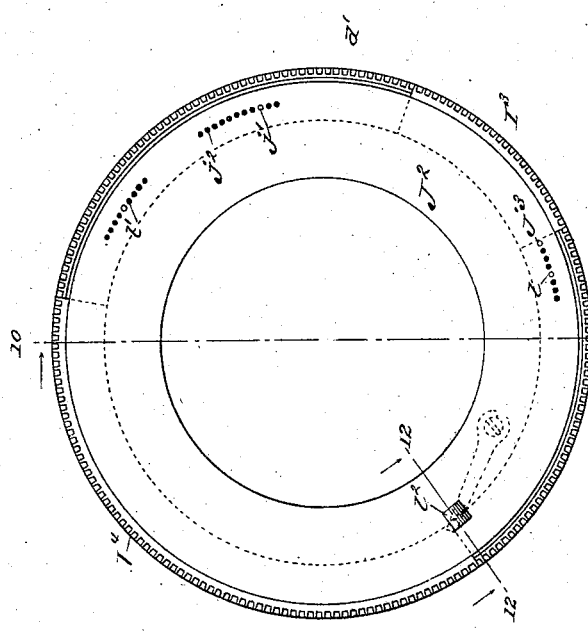
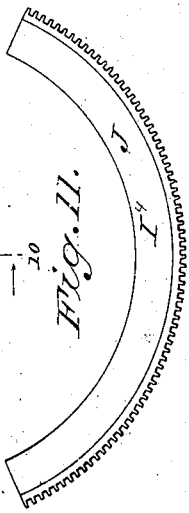
WITNESSES
Alfred Nelson,
ADM'R OF
John Nelson,
Inventor:
By his Attorneys
Baldwin Hopkins & Payne (No Model.) 11 Sheets—Sheet 9.
J. NELSON, Dec'd.
A. NELSON, Administrator. W. NELSON, present Administrator, succeeding prior Administrator.
STRAIGHT KNITTING MACHINE.
No. 576,881. Patented Feb. 9, 1897.
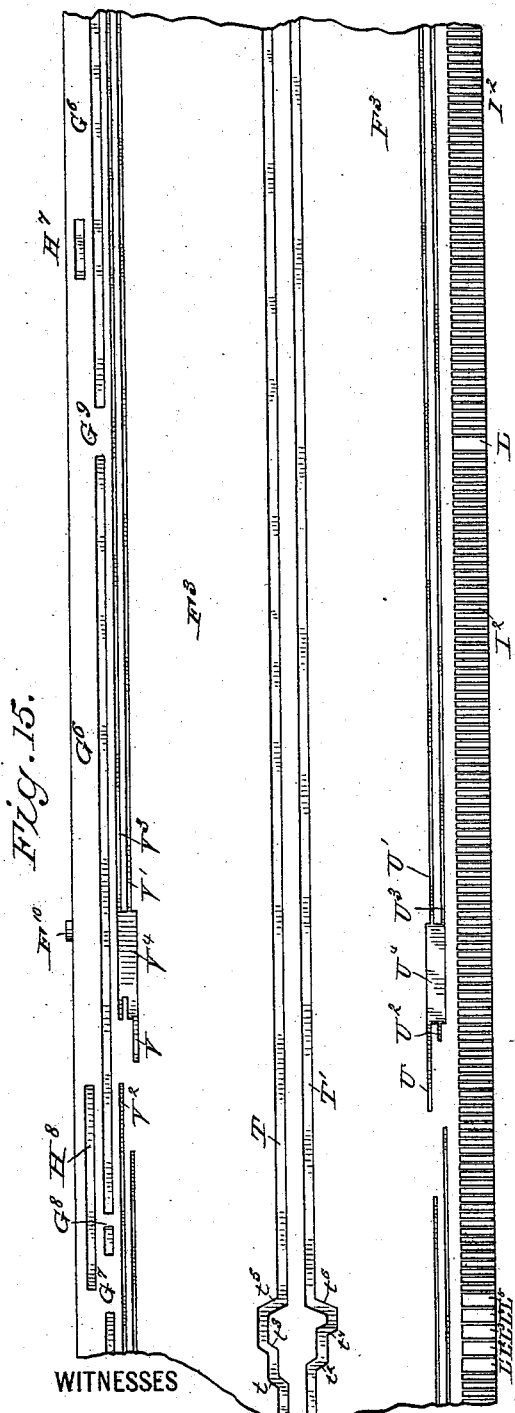
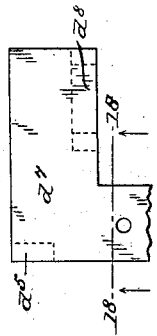
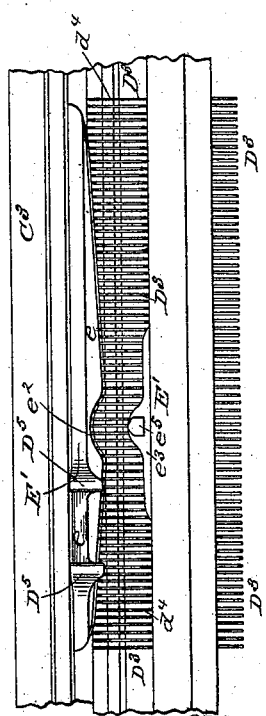
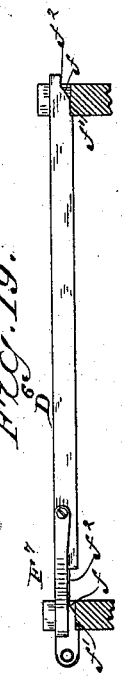

(No Model.) 11 Sheets—Sheet 10.
J. NELSON, Dec'd.
A. NELSON, Administrator. W. NELSON, present Administrator, succeeding prior Administrator.
STRAIGHT KNITTING MACHINE.
No. 576,881. Patented Feb. 9, 1897.
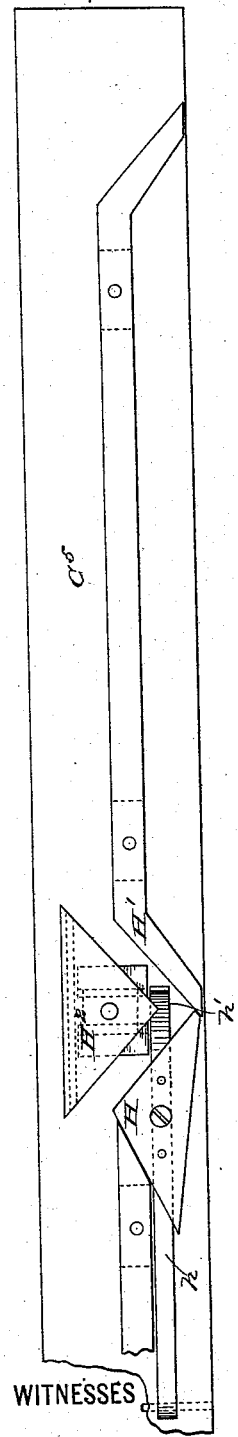
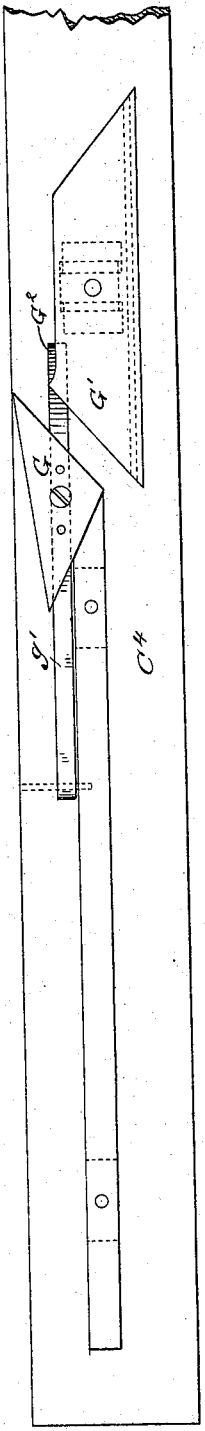
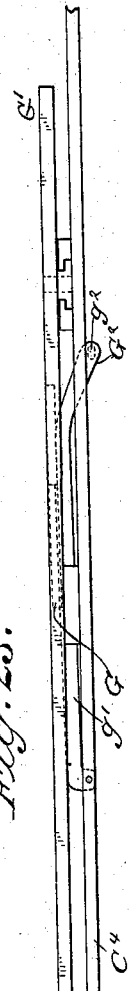
WITNESSES
Ed. A. Newman,
Al. C. Newman.
By his Attorneys
Baldwin Hopkins & Payton
Alfred Nelson
ADM'R OF
John Nelson,
Inventor (No Model.) 11 Sheets—Sheet 11.
J. NELSON, Dec'd.
A. NELSON, Administrator. W. NELSON, present Administrator, succeeding prior Administrator.
STRAIGHT KNITTING MACHINE.
No. 576,881. Patented Feb. 9, 1897.
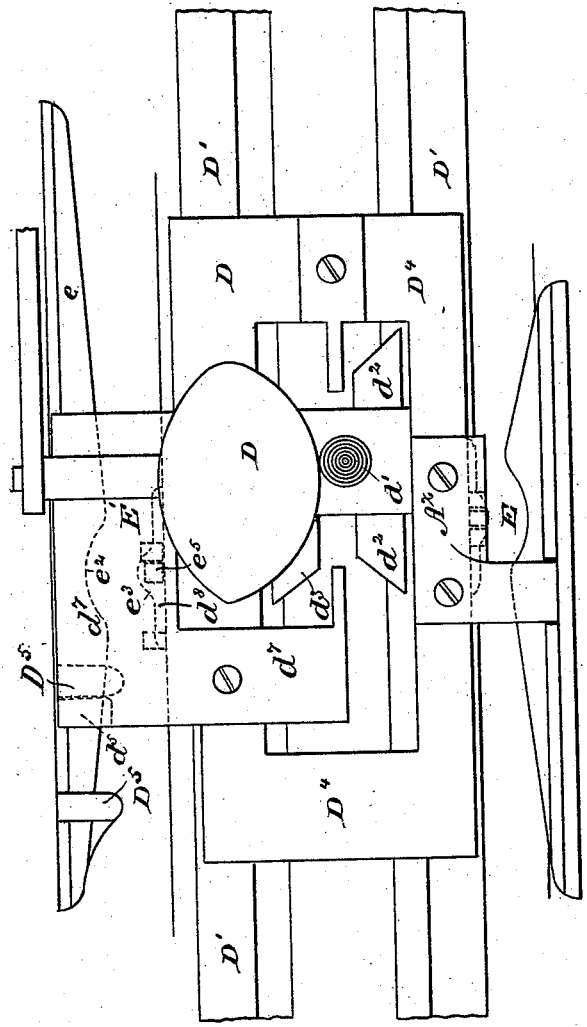

UNITED STATES PATENT OFFICE.

ALFRED NELSON, OF ROCKFORD, ILLINOIS, ADMINISTRATOR OF JOHN NELSON, DECEASED, ASSIGNOR OF ONE-THIRD TO RALPH EMERSON AND WILLIAM A. TALCOTT, OF SAME PLACE, WILLIAM NELSON, PRESENT ADMINISTRATOR, SUCCEEDING PRIOR ADMINISTRATOR, ASSIGNOR, BY MESNE ASSIGNMENTS, OF TWO-THIRDS TO EVA C. NELSON, WILLIAM NELSON, OSCAR NELSON, FRITHIOF NELSON, AND JOHN F. NELSON, OF SAME PLACE, AND ANNA NELSON RECK, OF CHICAGO, ILLINOIS.

STRAIGHT-KNITTING MACHINE.

SPECIFICATION forming part of Letters Patent No. 576,881, dated February 9, 1897.

Application filed May 16, 1885. Serial No. 165,731. (No model.)

*To all whom it may concern:*

Be it known that JOHN NELSON, deceased, formerly of Rockford, in the county of Winnebago and State of Illinois, did invent certain new and useful Improvements in Straight-Knitting Machines, of which the following is a specification.

This invention relates to improvements in machines of the class known as "straight-row" or "parallel-row" knitting machines, especially that type of this class of machines shown and described in United States Letters Patent No. 214,308, granted April 15, 1879, to the said John Nelson.

The object of this invention mainly is to provide automatic mechanism by means of which stockings, the legs of drawers, the arms of shirts, and the various parts of tubular-knit fabrics may be widened or enlarged and narrowed as desired.

Other objects are to improve various parts of the mechanism, such, for instance, as the mechanism which actuates the pattern-cylinder, mechanism for actuating the yarn-carrier, mechanism for imparting reciprocating movement to the cams which actuate the needles and the cams which actuate the presser-hooks, mechanism by which to provide for varying the length of the stocking or other fabric knitted, mechanism for maintaining the proper order of operation of parts, mechanism for lowering the end needle of one of the rows, and means for raising and lowering rocking supports of the needles.

The subject-matter deemed novel will hereinafter be specifically designated by the claims.

In the accompanying drawings an appropriate organization of mechanism is shown for knitting stockings, but instead of using all the improvements thereby illustrated and hereinafter in detail described essential features of these improvements may be employed without the others and the mechanism be modified in various ways without departing from the spirit of the invention herein claimed.

Figure 2:
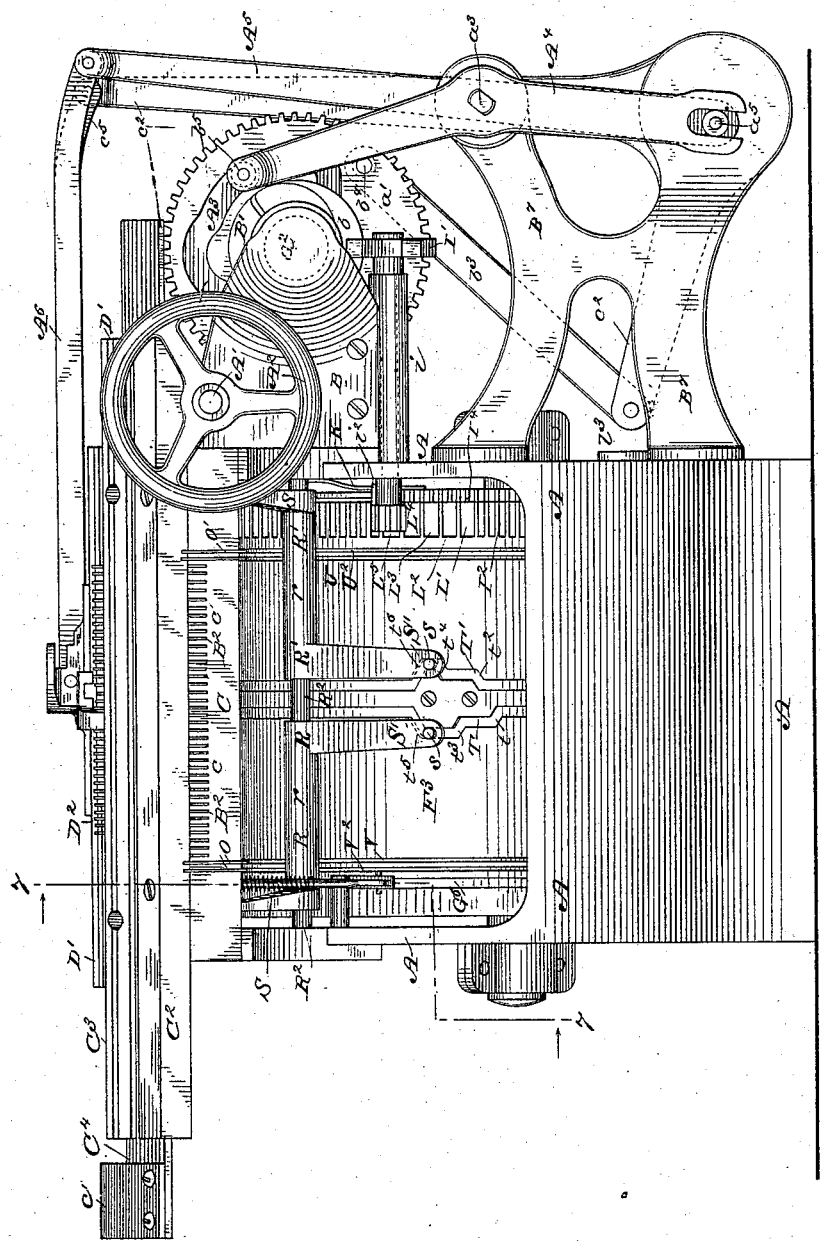

Figure 1 is a plan view of the machine. Fig. 2 is a front elevation. Fig. 3 is an elevation of the right end. Fig. 4 is an elevation of the left end. In each of the above figures the positions of the parts are those occupied by them just before the completion of a stocking. Fig. 5 is a view, partly in elevation as seen from the left end and partly in vertical section, on the line 5 5 of Fig. 1 near the center of the machine, with the yarn-carrier moved somewhat farther to the left, however, than shown in Fig. 1. Fig. 5$^a$ is a detail view showing the adjusting-screw of the yielding stop-arm which bears on the segment-gear. Fig. 6 is a sectional view, the section being on the line 6 6 of Fig. 1. Fig. 7 is a sectional view, the section being on the line 7 7 of Fig. 2. Fig. 8 is an elevation of the right end of the pattern-cylinder and attachments thereof. Fig. 9 is a front elevation of the right end of the pattern-cylinder and attachments thereof, showing a portion of the brake-shoe and a portion of the right end of the frame in section with its attachment for tripping the dog carried by the pattern-cylinder. Fig. 10 is a section on the line 10 10 of Fig. 8. Fig. 11 shows one of the segment-gears of the pattern-cylinder detached. Fig. 12 is a view, partly in elevation and partly in section, on the line 12 12 of Fig. 8. Fig. 13 is a similar section, a portion of the frame being represented and parts being in position different from those in which they are shown in Fig. 12. Fig. 14 is a front elevation of the main actuating-gear. Fig. 15 is a view showing a portion of the periphery of the pattern-cylinder flattened out. Fig. 16 is a plan view representing the cam for actuating the back presser-hooks and adjacent parts. Fig. 17 is a plan view of the attachment of the yarn-carrier slide, which makes shifting connection with the cam for actuating the back presser-hooks. Fig. 18 is a view, partly in elevation and partly in section, on the line 18 18 of Fig. 17. Fig. 19 is a front elevation, with the frame partly in section, showing the sustaining-bar, by means of which the left needle of the back row of needles is dropped and the rocking supports of all the needles of this row raised or lowered. Fig. 20 is a bottom view of a portion of the back main cam-slide with its attached cams, and Fig. 21 is a rear elevation of these devices with the parts in the same positions. Fig. 22 is a bottom view of a portion of the front main cam-slide and its attached cams, and Fig. 23 a front elevation of these devices with the parts in the same positions. Fig. 24 is a view, partly in rear elevation and partly in section, on the line 24 24 of Fig. 7, showing the switch-gate-controlling mechanism for the cams which actuate the front needles. Fig. 25 is a view, partly in plan and partly in section, on the line 25 25 of Fig. 24. Fig. 26 is a view, partly in front elevation and partly in section, on the line 26 26 of Fig. 6, showing in part the mechanism for actuating the widening-needles. Figs. 27, 28, and 29 are detail views designed to represent the manner of dropping the left needle of the back row of needles, these views representing, respectively, a front elevation, partly in section, a side elevation, partly in section, and a plan view. Fig. 30 is a plan view, on an enlarged scale, showing the yarn-carrier and connections thereof and the presser-hook cams; and Fig. 31, an elevation of one of the presser-hooks.

That side of the machine at which the work is discharged and from which a hand-wheel projects convenient to the right hand of the operator when facing the machine is called the "front" and the other the "rear" side, while the end on the right of the operator is termed the "right" and the other the "left" end of the machine throughout this specification.

The mechanism is mounted upon a suitable sectional main frame A. A driving-shaft A', extending transversely to the machine and suitably mounted at the right end thereof in the main frame, is provided with fast and loose pulleys to be driven in obvious way from any appropriate motor. A hand-wheel $A^2$ is secured to the front end of the driving-shaft, and this shaft is provided with a fast pinion $a$, which engages with a main actuating gear-wheel $a'$ on a stud-axle $a^2$, shown as cast with a projecting portion or bracket B at the right end of the main frame. This gear-wheel is cast with a sleeve-bearing $b$, by which it is mounted upon its stud-axle. A cam-wheel or irregular snail-gear B' is also formed with this sleeve for a purpose in turn to be explained.

A front needle-bed C and a rear needle-bed C' are each slotted and provided with a slotted steel plate $c$ to constitute guide-grooves for the front and rear rows of needles $b'$ and $b^2$, respectively, as well as for their jacks $B^2$ $B^3$, as in the above-referred-to Nelson patent of April 15, 1879. The bed-plates are inclined, as heretofore, and provided each with a lower longitudinally-grooved guide-bar or channel-plate $C^2$ $C^2$ and an upper longitudinally-grooved guide-bar or channel-plate $C^3$ $C^3$. A front main cam-slide $C^4$ and a back main cam-slide $C^5$, rigidly connected in suitable way, as by a yoke $c'$, reciprocate longitudinally in their guideways in the front and back channel-plates. These main cam-slides carry cams for actuating the needles of the front row $b'$ and the needles of the back row $b^2$, respectively, to advance and retract them and are reciprocated by mechanism such as next to be described.

An elbow-lever $c^2$, pivotally mounted upon the main-frame bracket by a stud $c^3$, is connected at the upper end of its longer arm with a bracket $c^4$ on the back main cam-slide $C^5$ by means of a pitman or link $c^5$. The other end of the shorter arm of this elbow-lever is linked by a connecting-rod $b^3$ with a wrist-pin $b^4$ on the gear-wheel $a'$. The result of this construction is that the main cam-slides are caused to reciprocate together or make two strokes for each revolution of their actuating-gear $a'$ and to operate the two rows of needles by their cams, farther on to be described.

A carrier D for the thread employed in knitting, (the thread may be of yarn, cotton, silk, &c.,) which carrier will hereinafter be termed the "yarn-carrier," is supported and actuated as next to be described. The yarn-carrier in this instance shown is mounted to reciprocate over the central opening $d$, across which the needles are projected and retracted, and moves in a path transversely to the paths traveled by the needles in their advancing and retracting movements, as is well understood. The yarn-carrier is guided in ways formed in the adjacent or inner edges of guide-bars D' D', secured to the needle-beds over their inner edges above and on opposite sides of the central opening $d$. The yarn-carrier is provided with an opening or eye $d'$, through which the yarn passes to be laid over and upon the open latches of the needles, as is well understood, and has at the front side two horns $d^2$ $d^2$ for opening the latches of the back row of needles, and at its rear side another horn $d^3$ for opening the latches of the front row of needles on the outward stroke of the main cam-slides—that is, the stroke toward the left end of the machine. As the needles of the back row at times both advance and retract at each stroke of the yarn-carrier, or make two reciprocations for every reciprocation of the yarn-carrier, the main cam-slides, and the cams E E' for actuating the front and rear presser-hooks $D^2$ $D^3$, it is essential that the same order of action of the yarn-carrier, (and with it its horns $d^2$ $d^2$,) the needles of the back row, and their coöperating presser-hooks $D^3$ be maintained at such times, thus necessitating the reversal of the relative positions of these parts at each stroke.

Were it not for this reversal in the relative positions of the parts it is obvious that the retracting movements of the needles of the back row to the proper extent to receive yarn upon their open latches and the action of the back presser-hooks (the details of which and their actuating mechanism will soon be described) would occur in advance of the proper order during those operations of the mechanism when the needles of the back row are making two reciprocations for each reciprocation of the main cam-slides and the cam which actuates the back presser-hooks. The result of thus maintaining the order of operation of the yarn-carrier and its horns and the needles of the back row and their coöperating presser-hooks obviously is that the yarn is always laid upon the open latches of the needles while they are retracting and while their coöperating presser-hooks are elevated preparatory to descending upon the yarn at the completion of the downward stroke of the needle, as in the prior patent of John Nelson, before mentioned.

As explanatory of the operation of the mechanism it may here be stated that the order of operation of the parts just above referred to is always as follows: First, a horn of the yarn-carrier acts to open the latches of the back row of needles; second, the needles commence to retract; third, the eye of the yarn-carrier is brought over the open latches of the needles and lays the yarn upon them and at the same time; fourth, the back presser-hooks move upward as the needles continue the downward movement, and, fifth, at about the time the needles have completed their downward movements their coöperating presser-hooks descend and engage the yarn drawn down by the hooked ends of the needles.

In the organization of mechanism shown the shifting of parts, so as to reverse their relative positions at the end of each stroke of the main cam-slides and the cams for operating the presser-hooks, is accomplished by causing the main cam-slides to move a short distance after the yarn-carrier and the cam for actuating the back presser-hooks have finished their stroke and by causing the cam for operating the back presser-hooks to begin its return stroke shortly after the yarn-carrier and the main cam-slides have commenced another stroke.

It should be borne in mind that, as in the before-mentioned Nelson patent, the front row of needles $b'$ make one reciprocation for each reciprocation of their actuating-cams carried by the front cam-slide $C^4$ and that this row of needles operates only when circular work is being done, they being thrown out of action during toe and heel knitting, and that the needles of the back row, while making two reciprocations for each reciprocation of their actuating-cams carried by the back main cam-slide at the time of heel and toe knitting, make but one reciprocation for each reciprocation of their actuating-cams during circular knitting, that is, at the time the front row of needles are working. It consequently follows that the change in the position of parts relatively to each other, as above described, is not necessary so far as the front row of needles, their coöperating presser-hooks, their actuating-cams, and the yarn-carrier and its horn $d^3$ are concerned, nor is it necessary that the change should take place in the relative positions of the yarn-carrier, its horns $d^2 d^2$, the cams for actuating the back row of needles, and the cam for actuating the back presser-hooks at the time that the needles of the back row are making but one reciprocation for each reciprocation of their actuating-cams. Nevertheless, as the parts are organized these changes (except that as the presser-hook cam E is fixedly attached to the yarn-carrier their relative positions do not change) occur throughout the operation of the machine and do not interfere in the least with the proper working of the mechanism at times when such changes effect no result.

The shifting mechanism employed for maintaining the above-described order of operations of parts is as follows: The gear-wheel $a'$ is provided on its front face (the face opposite that from which the wrist-pin $b^4$ projects) with a cam-groove $A^8$, in which works a pin $b^5$, which is provided with a roller on the upper end of a lever $A^4$, which is pivotally supported intermediate its ends by a stud $a^3$ on the main-frame bracket $B^7$ and at its lower end is forked or slotted and has self-adjusting jointed connection with the lower end of a lever $A^5$, mounted upon the before-described elbow-lever $c^2$ by means of a pivot $a^4$. A pivot-pin $a^5$ at the lower end of the lever $A^5$ is provided with a roller which enters the slot in the lower end of the lever $A^4$, making the needed self-adjusting connection of these levers. At its upper end the lever $A^5$ is connected by a link or pitman $A^6$ with the yarn-carrier. The result of this construction is that while the roller upon the pin $b^5$ travels that portion of the cam-groove extending from 1 to 2 the yarn-carrier will make the outward stroke of a reciprocation, that toward the left end of the machine, and move correspondingly with the main cam-slides. Next, while that portion of the cam-groove extending from 2 to 3 is acting on the roller the yarn-carrier remains at rest, though there is no pause in the movement of the main cam-slides other than that which takes place at the dead-center point of their stroke. Next, while that portion of the cam-groove extending from 3 to 4 is acting upon the roller of the lever $A^4$ the inward stroke of the yarn-carrier, that toward the right end of the machine, takes place simultaneously with the corresponding stroke of the main cam-slides, and at the completion of this inward stroke the yarn-carrier again comes to rest while that portion of the cam-groove extending from 4 to 1 acts upon the roller, the main cam-slides continuing to move, except when pausing at the dead-center of their stroke, during this cessation in the operation of the yarn-carrier. Next, the yarn-carrier is again moved outward with the main cam-slides at the commencement of another revolution of the gear-wheel $a'$.

To provide for shifting the position of the cam $E'$ for actuating the back presser-hooks relatively to the yarn-carrier, this cam is constructed, supported, and connected with the yarn-carrier in the following way:

The main slide or section $e$ of the cam moves in a guideway $e'$ in the upper rear channel-plate $C^3$ and is provided with a cam-recess $e^2$. The other slide or section $e^3$ of this cam reciprocates in its guide-groove $e^4$ in the back guide-bar $D'$ and is provided with a projection corresponding with the cam-recess $e^2$ of the main section. Levers or controlling-arms $d^4$ of the back presser-hooks $D^3$ project between the two sections of their actuating-cam and are of a width about corresponding with the space formed between the recess of the main section and the projection of the other section of the cam. The yarn-carrier is provided upon the under side of an attachment $d^7$ of its slide $D^4$ with a downwardly-projecting lug $d^5$, which enters a recess between upwardly-projecting lugs $D^5 D^5$ of the main section of the cam. The space between these lugs is of a length sufficient to allow of the necessary amount of play of the lug $d^5$ at the time of shifting. The small section $e^3$ of the cam is provided with an upwardly-projecting lug $e^5$, (see Figs. 16 and 30,) which enters a recess $d^8$ (see Figs. 17, 18, and 30) or space between two lugs on the under side of the yarn-carrier slide $D^4$. (See Figs. 17, 18, and 30.) This recess approximately corresponds in length with the space between the two lugs on the main section of the cam.

It will be understood that at the end of each stroke the presser-hook cam will be left in a position such that it will not be moved at first upon the commencement of the next stroke of the yarn-carrier, thus providing for shifting upon each stroke of the yarn-carrier and main cam-slides. The cam $E$ for actuating the front set of presser-hooks is the same in all respects as that for operating the back set of presser-hooks, except that it has detachable rigid connection with the yarn-carrier instead of having a shifting connection with it, so as to be adjustable automatically relatively thereto. A bracket $A^\times$, secured by screws to the yarn-carrier slide, serves to make connection between the cam $E$ and the yarn-carrier.

It will of course be understood that the presser-hooks are supported by their pivot-rods $a^6 a^6$ and work in guide-grooves in the respective guide-bars $D' D'$ and in the needle-beds essentially as heretofore.

While the manner of actuating the needles and of supporting them is the same, generally speaking, as heretofore, in some respects the mechanism has been improved, as will in turn be pointed out in the description next to be given.

Rocking needle-supports $F F'$ for both the front and back rows of needles are dropped and elevated by means of endwise-sliding sustaining-bars $D^6 D^7$, beneath them, supported at their ends in guideway-slots in the ends of the main frame. These sustaining-bars project beyond the main frame at its left end, so that they may be actuated by hand as desired. They have upon their under sides, near each end, inclined surfaces or cams $f f$, by the contact of which with the bottoms of the guideway-slots in the main-frame ends the sustaining-bars are raised and lowered as they are moved endwise. When the sustaining-bars occupy their normal positions for sustaining the rocking needle-supports in their elevated positions, these bars rest with their seats $f' f'$ upon the bottoms of their guideway-slots in the frame ends, and when lowered the notched or cut-away parts $f^2 f^2$ of these bars rest upon the bottoms of their guideways. The guideway-slot in the left end of the main frame for the back sustaining-bar $D^7$ is made of a width sufficient to permit of the left end of this bar being given a slight sidewise movement, for a purpose in turn to be explained. The ends of the needle-supports are pivotally connected with the under sides of the needle-beds as heretofore.

The two series of rocking levers $F^2$ for supporting the jacks $F^6$ of those needles of the back row which are on opposite sides of the central needles of this row are provided with the lugs $f^3 f^3$ for engagement with the pattern-cylinder $F^3$ and are the same as heretofore. Each of these levers is provided with the notch $f^4$ in the bottom of its jack-guideway, into which the rear end of the needle-jack descends when the lever is depressed to lower the shank or projection $F^4$ of the jack beneath the cams which actuate the needles by contact with the needle-jack projections.

The needle-jacks $F^6$, which are supported by the rocking levers $F^2$, are cut away upon their under sides by being recessed, as at $f^5$, in order that that portion $F^5$ of the rear needle-bed which is left solid from end to end of the bed may be made stronger and afford a longer bearing-support for the needles and needle-jacks than heretofore, while at the same time not interfering with the dropping of the levers and jacks in their operations. This solid portion $F^5$ of the rear needle-bed from its front edge backward for about half its width is made of uniform thickness, and with its top surface parallel to its under surface instead of being inclined from front to rear, as in the before-mentioned Nelson patent. The rear top surface of this solid portion is inclined to provide for the downward movement of the needle-jack when its cut-away portion extends above both the regular and the inclined surface of the solid portion of the needle-bed. By this construction it will be seen that wear of the needle-bed is lessened and strength attained at a point where it is needed.

The cams G G', carried by the front main cam-slide and by the reciprocation of which the needles of the front row are actuated, are in some respects different from those before employed. The movable cam G is carried at the end of an arm $g'$, pivotally connected with the front cam-slide, and is provided with an upwardly-projecting lug $G^2$, having a side pin $g^2$, which engages with one or the other of two guide-grooves $G^3$ $G^4$ in the inner vertical wall of the lower front channel-plate $C^2$. The lug $G^2$ passes through a slot in the front main cam-slide. At the left end of the guide-grooves $G^3$ $G^4$ there is pivoted between them a switch-gate $g^3$. (See Fig. 24.) A laterally-projecting arm on this switch-gate is connected with a vertically-moving controlling-arm $G^5$, which passes downward through the front needle-bed. It is pivotally connected at its lower end with a pivoted shoe $g^4$, which rides at times in a groove $G^6$ in the pattern-cylinder and at times upon cams $G^7$ $G^8$ $G^9$ during the actuations of the pattern-cylinder. A spring $G^5$, bearing at its upper end against the under side of the needle-bed and pressing downward upon the vertically-moving controlling-arm $G^5$, acts with a tendency to keep the shoe in its lowermost position at all times. It will be seen that during the movement of the pattern-wheel the switch-gate will be operated six times during each revolution of the pattern-wheel, the switch-gate being elevated every time the shoe of the controlling-arm rides up an incline of one of the cams $G^7$, $G^8$, or $G^9$, so as to cause the pin $g^2$ to travel in the lowermost one of its two guides in the channel-bar and to continue to travel in this guide while the shoe rides upon the surface of the cam. When the shoe descends the incline of the cam upon which it has been operating, the switch-gate will be lowered and the pin $g^2$ will be transferred to the uppermost one of its two guideways. Changes of the switch-gate occur when the pin $g^2$ is in the wide groove $g^6$. The result of this operation is that while the upper guide-groove controls the movements of the cam G the front row of needles will be thrown out of action, because the projections of the needle-jacks of this row of needles will remain behind the two cams G G', passing beneath the cam G at the space between these cams. When the lower guide-groove controls the cam G, it will be depressed, so that the needle-jacks will be transferred from behind the cam G to the front of the cam G' at each stroke during the reciprocations of the main cam-slides, thus causing the front needles to reciprocate once during each reciprocation of these cam-slides.

The needles of the back row are actuated by cams H H' and a triangular cam $H^2$, between the adjacent ends of the cams H H', Figs. 20 and 21. The movable cam H is carried by a pivoted arm $h$. The arm $h$ is provided with an upwardly-projecting lug $h'$, having a laterally-projecting pin $h^2$, working in guide-grooves $H^4$ $H^5$, having a switch-gate $H^9$ at their left ends similar to the switch-gate employed for the cams for actuating the front needles, Fig. 7. This switch-gate is also actuated by a vertically-moving controlling-rod $h^3$, pivotally connected at its lower end with a pivoted shoe $h^4$, substantially similar to the corresponding parts employed for actuating the cams of the front needles. This shoe $h^4$ is acted upon by a spring $h^5$ with a tendency to keep the shoe down upon the pattern-cylinder at all times. In this cylinder are two grooves $H^7$ $H^8$, into which the shoe is depressed to draw down the switch-gate $H^9$, so that the cam H will be controlled by way of its pin $h^2$ by the upper guide-groove $H^4$. At this time the cam H will be elevated, so that the needle-jacks will be acted upon in such a manner as to cause the back needles to reciprocate for every reciprocation of the main cam-slides. When the shoe of the controlling-rod is acted upon by the ungrooved portions of the pattern-cylinder, the switch-gate is actuated in such a manner that the cam H is controlled by way of its pin $h^2$ by the lower guide-groove $H^5$. At this time the cam H is depressed and the result is that the back needles make one reciprocation for each stroke of the main cam-slides.

The left needle in the back row of needles $b^2$ is automatically dropped and lifted at the beginning of the formation of a stocking by mechanism such as follows: The rocking support $f^6$ for this needle is cut away and provided with a cam $f^7$ on its under side, Fig. 28. Normally this needle-support rests with its regular or uncut under surface upon the back sustaining-bar $D^7$. When, however, this bar is moved sidewise, it is presented to the recessed part of the needle-support to permit this support and its needle to rock downward, the support when down resting upon its sustaining-bar outside of its cam $f^7$. A spring $f^8$ bears upon the rocking needle-support $f^6$ to insure its downward movement when this movement is permitted by the sidewise movement of the sustaining-bar and the withdrawal of the needle from the ledge $D^8$ of guide-bar $D'$. A hook $f^9$, having its shank mounted by the side of the needle-support, bears upon the needle, so that it is compelled to move downward with its support. The shank of the hook $f^9$ is shown as pivoted with the needle-support and as acted upon by the spring $f^8$. The sustaining-bar $D^7$ is moved laterally in one direction by a spring $F^7$ and in the other direction by an elbow-lever $F^8$, to which motion is imparted by the pattern-cylinder at the proper time for permitting of throwing the needle out of action. This elbow-lever, as shown, is provided with a cam end or incline $f^{10}$ for acting upon the sustaining-bar $D^7$ to move it in a direction contrary to that in which its spring moves it, and the opposite end of this lever is provided with a cam-lug $F^9$, acted upon by a wiper-cam $F^{10}$ upon the left face of the pattern-cylinder near its periphery. This dropping needle is actuated in such a manner that it is held down at the time that the yarn-carrier is supplying the yarn above it upon its first outward stroke in beginning the formation of a stocking and then moved upward in position to engage the yarn supplied to it upon the return stroke of the yarn-carrier, this operation being well understood.

The pattern-cylinder is intermittingly actuated at the ends of strokes of the main cam-slides by driving connections with the main actuating-gear $a'$ in the manner next to be explained. A shaft I, suitably mounted in a sleeve-bearing $i$ at the right end of the main frame, is geared with the cam-gear B' by means of a star-pinion I'. This star-pinion is moved twice for each revolution of the cam-gear and is fast upon the shaft I, which has imparted to it one revolution for each five revolutions of the actuating-gear and cam-gear as the mechanism is in this instance organized. A pinion $i'$ is fast upon the shaft I for engagement with gear-teeth $I^2$ upon the periphery of the pattern-cylinder at its right end. A long tooth $i^2$ is provided upon this pinion $i'$ for engagement at proper intervals with sliding segment-gears $I^3$ $I^4$, adapted to move at times independently of the pattern-cylinder. These segment-gears have adjustable connection with the pattern-cylinder, so that their teeth, no matter in what positions they may be adjusted for action, will form continuations of or register with the teeth of the pattern-cylinder gear $I^2$. The adjustable segment-gears $I^3$ $I^4$ are of similar formation, one of them being of greater extent than the other and each adapted to be slid and held in position in an annular guideway J' of the pattern-cylinder. The segment-gear $I^3$ has a segmental guide-flange J, shouldered at $j$ and fitting so as to slide freely in the guideway J', formed at the right end of the pattern-cylinder partly by a groove in the cylinder end and partly by a ring $J^2$, riveted or otherwise suitably attached to the end of the cylinder. The shoulder $j$ of the segment-gear projects beneath the toothed end of the pattern-cylinder, so that the segment-gear teeth and the teeth of the pattern-gear will be flush with each other and the segment-gear be prevented from displacement. A cross-pin $j'$, together with a series of pin-holes $j^2$, serve to limit the movement of the segment-gear $I^3$ independently of the pattern-cylinder in a forward direction or that in which the cylinder rotates, and another series of pin-holes and a pin $j^3$, behind the segment-gear $I^3$, provide for adjusting the segment-gear in position relatively to the pattern-cylinder and to prevent backward movement of the segment-gear. This last-named pin and the openings in which it is secured in adjusting the segment-gear may be threaded to prevent accidental displacement of the adjusting-pin or any equivalent means for adjusting may be provided. Premature forward movement of the segment-gear is prevented by a yielding stop K. The forward portion of the segment-gear is borne sidewise against by this stop, which is shown as formed by a spring-bar secured at one end to the inner surface of the main frame at its right end, bent sidewise, so as to bear at $K^\times$ against the frame, and having a cam projection or incline $k$, against which the forward end of the segment-gear bears and along in frictional contact with which this segment-gear is forced when positively operated, as will be obvious. A screw $k^\times$, passing through the end of the frame and engaging a screw-tap in the thickened end of the stop, as shown in Fig. $5^a$, serves to adjust the stop and causes it to act with greater or less force in its resistance to the movement of the segment-gear to insure proper action by preventing accidental movement of the gear.

It will be seen that when during the actuation of the pattern-cylinder this cylinder has been brought to a position such that the cross-pin $j^3$ abuts against the rear end of the segment-gear this gear is forced to partake of the forward movement of the pattern-cylinder, and is thus moved into position to be acted upon by the long tooth of the pinion $i'$, with the result that as this segment-gear is intermittingly operated by this long tooth, and during a period of rest of the pattern-cylinder caused as presently to be explained, it will be moved forward the distance of one of its teeth every time the pinion makes one revolution until it has been fed forward a distance such as to cause its forward end to strike the stop-pin $j'$. During the time, or more or less of the latter portion of the time, that the long tooth or the pinion $i'$ is acting upon the segment-gear $I^3$ to feed it independently of the pattern-cylinder an untoothed space L of the pattern-cylinder, Fig. 15, is occupied by the pinion, the pattern-cylinder gear being mutilated by the omission of one tooth at this space. At this time the pattern-cylinder is at rest, the period of rest of the pattern-cylinder, which occurs during the occupancy of the space L by the pinion, depending upon the adjustment of the segment-gear. The shorter the distance between the pins $j'$ $j^3$ the shorter the period of rest. When the forward end of the segment-gear has been brought into contact with its stop-pin, motion is first imparted to the pattern-cylinder by way of this segment-gear, as will be obvious, and after this the pinion acts upon the gear of the pattern-cylinder.

The long segment-gear $I^4$ is of construction similar to that of the segment-gear $I^3$ and is adjustably mounted in the pattern-cylinder in corresponding manner, there being provided for this segment-gear $I^4$ a series of adjusting-holes $l$ in front, as well as a series of such holes $l'$ at rear, both series of holes being provided with adjustable stop-pins, such as that used in connection with the segment-gear I³ at its rear. The brake-stop K acts upon the segment-gear I⁴ in the same manner as upon the segment I³.

When upon the contact with the rear end of the segment-gear I⁴ of its adjusting-pin carried by the pattern-cylinder this gear has been brought into position for engagement by the long tooth of the pinion $i'$, the pinion will occupy an untoothed space L' and will continue to rotate in this space without actuating the pattern-cylinder until the segment-gear becomes engaged with the pattern-cylinder by means of a dog $l^2$, which crosses the annular guideway J' in the pattern-cylinder and is carried by this cylinder. At this time a movement to the extent of that produced by the action imparted by two teeth of the pinion is given to the pattern-cylinder, and the pinion is presented to another untoothed space L². Subsequently and at corresponding intervals the cylinder is successively actuated by way of the segment-gear and long tooth $i^2$ of the pinion and brought to rest with the pinion occupying other untoothed spaces, in this instance three in number, L³ L⁴ L⁵. As the pinion $i'$ passes from the space L⁴ into the last space L⁵ the dog $l^2$ is automatically tripped by a wiper-cam $l^3$ on the inner surface of the right end of the main frame, in contact with which the cam-like projecting end of the dog is brought, Fig. 13. This dog is acted upon by a spring $l^4$ with a tendency to keep it projected outward. When the dog is tripped, the spring yields to allow of endwise movement of the dog to bring its groove $l^5$ in position to admit of the passage of the segment-gear I⁴. After this tripping of the dog and during the time that the pinion travels the last space L⁵ the segment-gear is fed forward until it abuts against its front adjusting-pin, after which the cylinder continues to move step by step, and the segment-gear becomes inoperative until it is again acted upon by its rear adjusting-pin.

In order to provide for widening and narrowing the work—that is to say, to increase or lessen the length of the rows of stitches as desired in the formation of a stocking—needles which may be thrown into and out of action are provided at the ends of the main rows of needles. These widening-neeedles may be provided at one end of each main row of needles (those ends opposite each other, say the left ends) or at both ends of each of such rows. In this instance these needles are provided in series at both the right and left ends of the two main rows of needles, a corresponding number of such widening-needles being provided at each end of the two rows, and, as shown, there are in all eight such needles, two at each flank of both the front and back rows of main needles, but any desired number of these additional widening-needles are to be employed, more than represented being used in practice.

The widening-needles M N at the opposite ends of the front and back rows of needles $b'$ $b^2$ are shown as supported and actuated in the following way: Rocking levers O O', pivotally attached to the front needle-bed C by means of a pivot-rod passing through holes $o'$ in them, support the jacks P' of the two series of front widening-needles in somewhat the same way as the jacks of needles in the main row of back needles are supported in their rocking levers, Fig. 6. The jacks P' are provided with shanks or upward projections $p'$ to be operated by the cams G G' of the main needles of the front row when these shanks are elevated to bring them under the control of the cams. Reciprocating cam-bars Q', having corresponding inclines $q^2 q^2$ upon their upper and under surfaces to constitute their cams, work endwise through holes $q'$ in the rocking levers O O', so as to positively move these levers up or down, according to the direction in which the cam-bars are moved, in the desired order for throwing the widening-needles into and out of action by bringing the shanks of their jacks into positions to be operated upon by the cams or withdrawing them from such positions. This positive motion of the rocking levers is important. These reciprocating cam-bars work in a guide-groove in the needle-bed and are supported in seat-slots in the opposite ends of the main frame and by a plate Q², secured to the under side of the needle-bed and crossing the central portion of the groove in which the bars reciprocate.

As the mechanism is in this instance organized the cam-bars for actuating the front widening-needles are operated by connecting mechanism actuated by the pattern-cylinder. This connecting mechanism, as shown, is as follows: Two slides R R' are mounted by their sleeves $r r$, so as to slide to and fro upon a frame-rod R², crossing between the ends of the frame beneath the front needle-bed. These slides are of similar construction, each being provided with an upwardly-projecting inclined arm S S at one end of its sleeve and with a downwardly-projecting arm S' S' at the opposite end of its sleeve. These downwardly-projecting arms carry pins $s s$, which project into cam-grooves T T', respectively, in the pattern-cylinder. The upwardly-projecting arms S S are slotted to embrace the reciprocating cam-bars, respectively, each arm engaging with a notch $q^3$ in the cam-bar with which it connects. In this way as the slides are reciprocated by the action of the pattern-cylinder cam-grooves T T' they impart movement to their respective cam-bars, and these bars are caused to raise and lower the rocking levers and jacks of the widening-needles and thus throw these needles into or out of action.

While the long straight portions of the cam-grooves T T' are acting upon the reciprocating slides R R', no movement is imparted to them. When the cam $t$ of the groove T is presented to the pin $s$ of the left slide R, this slide will be moved a short distance toward the left end of the machine, and the rocking lever O of the inner one of the left widening-needles M will be lifted to throw this needle into action. The inner one of the right widening-needles M will be thrown into action when the cam portion $t^2$ of the groove T' acts upon the pin $s$ of the right slide R'. The outer needle of the left widening-needles M will be thrown into action when the pin of the left slide is acted upon by the cam portion $t^3$ of the cam-groove T. After this the outer one of the right widening-needles will be thrown into action by the operation of the cam portion $t^4$ of the cam-groove T' upon the pin of the right slide. All the front widening-needles are simultaneously thrown out of operation by the action of the inclined portions $t^5$ $t^6$ of the grooves T T' upon the pins of the slides, thus causing them to move toward each other to bring the pins into position to be operated upon by the long straight portions of the grooves.

The back widening-needles N have their jacks $n$ supported by levers $N^2$, rocking upon the pivot-rod, which supports the before-described rocking levers $F^2$. Each of the rocking levers $N^2$ is provided with two downwardly-projecting lugs $n'$ $n^2$, so that these rocking levers may be actuated by the pattern-cylinder in substantially the same manner that the rocking levers $F^2$ are actuated by it. The shanks of the jacks $n$ are lifted so as to be brought in position to be acted upon by the back needle-cams and depressed to prevent the action upon them of these cams by the rocking motions of their levers $N^2$, as will readily be understood.

As heretofore the case in the construction of the rocking levers $F^2$, each of the rocking levers $N^2$ is bent laterally, so that its front lug $n^2$ will occupy a different plane from that in which its rear lug $n'$ lies, in order that as one of these lugs rides in a groove in the cylinder the other may bear upon the regular surface of the cylinder's periphery.

During the time that the back widening-needles are out of action the front lugs of their rocking levers occupy grooves and their rear lugs bear upon the periphery of the cylinder. When during the movement of the pattern-cylinder it is brought to a position such that the rear lug of the rocking lever of the inner right-hand rear widening-needle is presented to the groove U and the front lug of this rocking lever is presented to the periphery of the cylinder as it rides out of the groove U', the rocking lever will be lifted to elevate the needle-jack which it carries, and thus bring the needle connected with this jack into operation. As the pattern-cylinder is moved into proper position the front lug of the inner left-hand rocking lever of the back widening-needles rides out of the cam-groove V onto the peripheral surface of the pattern-cylinder, and at the same time the rear lug of this rocking lever descends into the groove V' of this cylinder. The result of this is to throw the inner left-hand back widening-needle into operative position. After this another widening-needle at the right of the back widening-needles, and subsequently another widening-needle at the left of the back widening-needles, are thrown into action by the operations upon the lugs of their rocking levers of the pattern-cylinder and the cam-grooves $U^2$ $U^3$ $V^2$ $V^3$ therein, as will readily be understood. These back widening-needles are all thrown out of action simultaneously at the time the front lugs of the rocking levers $N^2$ descend into the wide grooves $U^4$ $V^4$ of the pattern-cylinder, while the rear lugs of these levers pass out of said grooves (to which they had been conducted by the grooves U V' $U^3$ $V^3$) to the periphery of the pattern-cylinder.

Subsequently and during the time that the widening-needles are out of action the front lugs of their rocking levers ride in the long grooves U' V' $U^2$ $V^2$ of the cylinder and their rear lugs upon the periphery thereof.

It should be noticed that presser-hooks on the flanks of the back and front rows of presser-hooks $D^2$ $D^3$ coöperate with the widening-needles when they are in action, as will readily be understood; also that the reciprocating cams E E' for actuating the two rows of presser-hooks operate upon them at all times when the machine is at work, as heretofore, the front row of presser-hooks having imparted to them the same movements (two motions for each stroke of their cam) as those of the back row, although it will be seen that but one motion on each stroke of their cam is needed for the proper actuation of the presser-hooks of the front row.

The levers O O' $N^2$ for the jacks P' $n$ of the front and back widening-needles are each constructed with a slot W, wider at its rear end than at its front, in order that the jacks of the widening-needles may have imparted to them the proper movements to depress their shanks when the levers are rocked downward to throw the widening-needles out of action. Each of these levers has an upper arm W' and a lower arm $w$ in advance thereof similar to those of the rocking levers $F^2$, the under surface of the upper arm and the upper surface of the lower arm extending parallel with each other to form the needed guideway for the jack. The bottom of the slot W inclines upward from near its rear end to the rear termination of the upper surface of the lower arm. The result of this construction is that when the lever is rocked to depress its forward end the needle-jack will be depressed at its rear end by the downward pressure upon it of the forward end of the upper arm of the lever, the front or hooked end of the needle-jack bearing upon the needle-bed, and in this way the shank of the needle-jack is sufficiently depressed to prevent its actuation by its reciprocating cams. When the rocking lever moves upward, the shank of the needle-jack carried by it is elevated to bring it in position to be operated by its actuating-cam, as will readily be understood.

In the operation of the machine when about to begin to knit a stocking the positions of various parts of the mechanism are as follows: All the needles except the widening-needles are in their advanced positions. The widening-needles are in their retracted and inoperative positions. The cams for operating the needles of the back row are set to cause these needles to retract and advance at each stroke of the main cam-slides and so make two reciprocations at each reciprocation of these slides to knit the toe of a stocking. The mechanism which acts upon the dropping needle at the left end of the back row of main needles is in its operative position ready to cause this needle to drop when it has been partially retracted upon the first outward stroke of the main cam-slides. Now upon the advance or outward stroke of the first reciprocation of the main cam-slides both sets of needles are retracted or moved downward, the needles of the back row being advanced also after being retracted on this stroke. The yarn is laid by the yarn-carrier across the needles preparatory to their downward movement, the horns which move with the yarn-carrier having opened the latches of the needles, if closed, so that the yarn lies upon the latches. The presser-hooks are actuated in such manner as to be first moved upward in time to come above the yarn as it is carried downward by the needles, so that upon the subsequent advance of the needles the presser-hooks move downward and retain the yarn that slips out of the open latches of the needles, the yarn so retained serving to close the latches upon the next downward movement of the needles of the back row in the well-known manner of knitting in this class of machines. The dropping needle (that at the left of the back row of needles) as it is retracted on this first stroke of the main cam-slides passes beneath the yarn so as not to engage it; but before the completion of this outward stroke the mechanism which operates upon this dropping needle is actuated to lift this needle so that it occupies the same inclined plane as that occupied by the other needles of its row. This needle therefore advances in line with the other needles of the back row during the latter part of the outward stroke of the main cam-slides, but passes above instead of beneath the yarn as it did in its downward stroke. At the end of the first stroke of the main cam-slides the switch mechanism of the cam for actuating the front row of needles is operated to throw these needles out of action in their retracted positions, in which positions they remain during the knitting of the toe of a stocking, and the yarn-carrier is shifted relatively to the cams for actuating the presser-hooks and the cams for actuating the needles, and upon the inward stroke of the first reciprocation the above-described actions of the yarn-carrier, its horns, the needles of the back row, and their coöperating presser-hooks are repeated. The step-by-step motion imparted to the pattern-cylinder during the knitting of the toe and at the end of each stroke of the main cam-slides causes the needles first on one flank and then on the other of the back row of needles to be successively thrown out of action one at a time, then in part thrown into action again, and so on, thus narrowing the row of stitches in the formation of the toe, as heretofore and as well understood. Upon the completion of the toe the switches of the cams for actuating both the front and rear needles are actuated in order to throw the needles of the front row into action and to cause the needles of the back row to operate once during each complete reciprocation of the main cam-slides instead of operating twice at each reciprocation, as they did when forming the toe. Circular knitting now goes on, while the cylinder remains at rest, to form the foot or that portion of the stocking between the toe and heel. During the time that this portion of the stocking is being formed the pinion $i'$ occupies the untoothed space L of the pattern-cylinder, and the long tooth of the pinion acts upon the segment-gear $I^3$ to feed it independently of the pattern-cylinder. The length of the foot of a stocking depends upon the adjustment of this segment-gear, the pinion continuing to act in the untoothed space of the pattern-cylinder during the time that the segment-gear is being fed forward to bring it against its front stop-pin. When so brought against this stop-pin, the foot portion of the stocking is finished and intermittent motion is imparted to the pattern-cylinder by the pinion, and the above-described operations which took place for forming the toe are repeated to knit the heel.

After the formation of the heel and during the knitting of the ankle or lower portion of the leg of the stocking (at which time it will of course be understood that both sets of needles are acting as when the foot portion of the stocking was being knit) the pinion $i'$ acts in the space $L'$ of the pattern-cylinder gear, and its long tooth operates upon the larger segment-gear $I^4$, moving it independently of the pattern-cylinder. When this segment-gear has been fed forward until its front end abuts against the dog $l^2$, the pinion acts upon the pattern-cylinder and then occupies the space $L^2$. It should here be noticed that the length of the ankle portion of the stocking depends upon the adjustment of the segment-gear $I^4$.

The movement imparted to the pattern-cylinder as its actuating-pinion passes from the space $L'$ to the space $L^2$ throws into action, first, the inner right-hand back widening-needle and then the inner left-hand front widening-needle. These widening-needles are thrown into action upon different strokes of the same reciprocation of the cam-slides in the order mentioned. It should be borne in mind that as the mechanism is organized the cam-slides make their strokes between actuations of the pattern-cylinder, and that as this pattern-cylinder is twice actuated at the time its operating-pinion is passing from the space $L'$ to the space $L^2$ the main cam-slides make two strokes, one after the movement imparted to the pattern-cylinder by the action of the long tooth of the pinion upon the segment-gear $I^4$, and the other after the actuation imparted to the pattern-cylinder by the engagement with its tooth which separates the spaces $L'$ $L^2$ of a tooth of its actuating-pinion. As the mechanism is timed there are five rounds or rows of stitches knitted after throwing the first two widening-needles into action before other widening-needles are thrown into action, and a corresponding number of rows of stitches are knitted between the times of successively throwing into action other widening-needles. When the actuating-pinion of the pattern-cylinder next operates the cylinder and passes from the space $L^2$ to the space $L^3$, first the inner left rear widening-needle is thrown into action and then the inner right front widening-needle is thrown into action. Next, when the pinion passes from the space $L^3$ to the space $L^4$ another of the right back widening-needles and a needle of the front left widening-needles are thrown into action, and as the pinion passes from the space $L^4$ to the space $L^5$ another of the left back widening-needles and another of the right front widening-needles are thrown into action.

As before remarked, additional widening-needles to the desired number for continuing the gradual widening of the stocking to the preferred extent are to be employed, but their illustration has not been deemed necessary.

During the movement imparted to the cylinder at the time of throwing into action the last widening-needle the dog $l^2$ is tripped, and after this the segment-gear $I^4$ is fed forward independently of the pattern-cylinder by the long tooth of the pinion until the front end of this segment-gear is brought against its stop-pin. After this the segment-gear and cylinder move together, the stocking having been gradually enlarged and completed.

It will be understood that the length of that portion of the stocking which is knitted after the last widening-needle is thrown into action and during the time that all the widening-needles are acting will depend upon the adjustment of the front stop-pin for the segment-gear $I^4$. When the cylinder has motion imparted to it, at the time that the segment-gear $I^4$ comes in contact with its front stop-pin all the widening-needles are thrown out of action simultaneously.

Upon the completion of a stocking the operation of laying the yarn on the needles is discontinued and the cam-slides are reciprocated to cause the needles to go through an idle movement, thus causing the loops to be cast from the needles. The result of this is that both the front and back needles for one stroke of the main cam-slides will be down at the same time, leaving an unobstructed space at the opening $d$ for the discharge of the stocking. Upon the last stroke of the machine after completing a stocking the switch mechanism for controlling the cams for operating the front row of needles is actuated and the front needles are advanced. At the same time the switch mechanism for controlling the cams for operating the back row of needles is actuated, so that these cams operate to actuate the back row of needles in such manner as to adapt them for knitting the toe of the next stocking. The mechanism which acts upon the dropping-needle is also operated upon the last stroke of the main cam-slides, and the parts are now left in the positions at which the commencement of the operations above described takes place in the formation of another stocking.

What is herein claimed is—

1. The combination, substantially as set forth, of the cam-grooved main actuating-gear; means for operating it; the reciprocating yarn-carrier; and the jointed pivoted connecting-levers and pitman, between the actuating-gear and the yarn-carrier, by which motion is imparted from the actuating-gear to the yarn-carrier.

2. The combination, substantially as set forth, of the reciprocating main cam-slides; the needles; needle-actuating cams carried by the slides; the cam-grooved main actuating-gear; means for operating it; connecting-levers and pitmen between the cam-slides and the actuating-gear; the reciprocating yarn-carrier; and connecting-levers and pitman between the cam-gear and the yarn-carrier.

3. The combination, substantially as set forth, of the reciprocating main cam-slides; the needles; needle-actuating cams carried by the cam-slides; the cam-grooved main actuating-gear; means for operating it; the connecting-levers and pitmen between the actuating-gear and the cam-slides; the reciprocating yarn-carrier; the connecting-levers and pitman between the actuating-gear and the yarn-carrier; and the reciprocating presser-hook cam, having a shifting connection with, and actuated by the yarn-carrier.

4. The combination, substantially as set forth, of the cam-grooved main actuating-gear; means for operating it; the reciprocating yarn-carrier; connections between the yarn-carrier and the actuating-gear, by means of which the yarn-carrier is reciprocated; for the purpose specified.

5. The combination, substantially as set forth, of the reciprocating cam-slides; the needles; needle-actuating cams carried by the slides; the cam-grooved main actuating-gear; means for operating it; the jointed levers and pitmen connecting the actuating-gear with the slides; the reciprocating yarn-carrier; a pin engaging the groove in the actuating-gear; and the jointed levers and pitman connecting the pin with the yarn-carrier.

6. The combination, substantially as set forth, of the reciprocating main cam-slides; the needles; the needle-actuating cams carried by the cam-slides; the cam-grooved main actuating-gear; means for operating it; the jointed levers and pitmen connecting the actuating-gear with the slides; the reciprocating yarn-carrier; a pin engaging the cam-groove in the actuating-gear; the jointed levers and pitman connecting said pin with the yarn-carrier; the reciprocating presser-hook cam; and the shifting connections between the yarn-carrier and the presser-hook cam, for the purpose specified.

7. The combination of the reciprocating main cam-slides, needle-actuating cams carried thereby, the reciprocating yarn-carrier, the pitman for actuating the main cam-slides, the pitman for actuating the yarn-carrier, the main actuating-gear having the cam-groove and wrist-pin, the elbow-lever actuated by connection with said wrist-pin and with which the pitman for actuating the main cam-slides is connected, the lever pivoted to the elbow-lever and with which the pitman for actuating the yarn-carrier is connected, and the lever actuated by connection with the cam-groove of the main actuating-gear and having self-adjusting connection with the lever for actuating the yarn-carrier, substantially as and for the purpose set forth.

8. The combination of the reciprocating main cam-slides, needle-actuating cams carried thereby, the shifting-cam for actuating presser-hooks, the reciprocating yarn-carrier having shifting connection substantially as described with said presser-hook cam, the pitman connected with the main cam-slides, the pitman connected with the yarn-carrier, the main actuating-gear having the cam-groove and wrist-pin, the elbow-lever connected with the pitman for actuating the main cam-slides and operated by connection with the said wrist-pin, the lever pivoted to the elbow-lever and with which the pitman for actuating the yarn-carrier is connected, and the lever actuated by connection with the cam-groove of the main actuating-gear and having self-adjusting connection with the lever which connects with the pitman for actuating the yarn-carrier, substantially as and for the purpose set forth.

9. The combination of the reciprocating yarn-carrier, with the two sections of the presser-hook cam E' having shifting connection with the yarn-carrier slide by means of lugs and recesses, substantially as and for the purpose set forth.

10. The combination of the frame, the rocking needle-supports, and their endwise-sliding sustaining-bar supported in frame-guideways and provided with the inclines for raising and lowering the rocking needle-supports, substantially as and for the purpose set forth.

11. The combination of needle-jacks recessed upon their under sides, rocking levers for supporting the jacks, the needles connected with the jacks, and the needle-bed having the bearing-surface for the needles parallel with its under surface, substantially as and for the purpose set forth.

12. The combination of the dropping needle, its rocking support cut away and provided with a cam on its under side, the hook holding the needle down to its support, the spring acting on the support, the sustaining-bar beneath the support, and mechanism for actuating this sustaining-bar to move it sidewise for dropping and elevating the support, substantially as and for the purpose set forth.

13. The combination of the dropping needle, its support having the cam-like portion, the sidewise-moving sustaining-bar by the actuation of which the needle and its support are dropped or elevated, the spring for moving the sustaining-bar in one direction, the elbow-lever for moving it in the opposite direction, and the pattern-cylinder provided with the wiper-cam acting on the cam-lug of the elbow-lever, substantially as and for the purpose set forth.

14. The combination, substantially as set forth, of the main actuating-gear; the cam-gear rotating therewith; the star-pinion engaged by the cam-gear; the pattern-cylinder; the shaft of the star-pinion; the pinion connecting this shaft with teeth on the pattern-cylinder; the segment-gear carried by, and movable on the pattern-cylinder, and actuated by the pinion on the shaft of the star-pinion, for the purpose specified.

15. The combination, substantially as set forth, of the main actuating-gear, the reciprocating main cam-slides provided with the needle-actuating cams, connecting mechanism substantially as set forth by means of which the main cam-slides are operated by the main actuating-gear, the cam-gear rotating with the main actuating-gear, the pattern-cylinder, its driving-pinion, the shaft of this pinion, and the star-pinion mounted on this shaft and actuated by the cam-gear, whereby the pinion engaging with the pattern-cylinder is operated only at the ends of strokes of the main cam-slides.

16. The combination, substantially as set forth, of the pattern-cylinder provided with the mutilated gear, the pinion for engaging this gear having the long tooth, mechanism for actuating the pinion, the segment-gears movable on the pattern-cylinder, the means substantially as described for preventing premature forward movement of the segment-gears, and means substantially as described for limiting their movements independently of the pattern-cylinder, for the purpose described.

17. The combination, substantially as set forth, of the pattern-cylinder having the mutilated gear; its driving-pinion provided with the long tooth; the segment-gear $I^3$, movable on the pattern-cylinder; and the brake-stop acting on the segment-gear.

18. The combination of the pattern-cylinder having the mutilated gear, the segment-gear I⁴ movable on and connected with the pattern-cylinder, the pinion engaging the cylinder-gear and having the long tooth for actuating the segment-gear, the brake-stop acting on the segment-gear, the dog for engaging the segment-gear with the pattern-cylinder, and the dog-tripping mechanism, substantially as and for the purpose set forth.

19. The combination of the cam-wheel, mechanism substantially as set forth for actuating it, the star-pinion, the long-toothed pinion on the shaft of the star-pinion, the pattern-cylinder having the mutilated gear, the segment-gear movable on and connected with the pattern-cylinder, and the stop-pins for controlling the movements of the segment-gear independently of the pattern-cylinder, substantially as and for the purpose set forth.

20. The combination, substantially as set forth, in a straight-row-knitting machine, of a reciprocating cam-bar having two working surfaces, mechanism substantially as set forth for actuating it, rocking levers both raised and lowered positively by the action of the cam-bar, jacks supported by the rocking levers, and the needles connected with the jacks and thrown into and out of action by the movements imparted to the rocking levers by their cam-bar.

21. The combination, substantially as set forth, of two series of widening-needles, rocking levers supporting the jacks of the needles, reciprocating cam-bars having two working surfaces for actuating the rocking levers, and mechanism substantially as set forth for actuating the cam-bars, for the purpose set forth.

22. The combination of the reciprocating cam-bar, the slide engaging therewith, means, substantially as set forth, for actuating this slide, the rocking lever, the needle-jack, and the needle, substantially as and for the purpose set forth.

23. The combination of two series of front widening-needles, the rocking levers supporting the jacks of these needles, the reciprocating cam-bars actuating the rocking levers, the slides engaging the cam-bars, and the intermittingly-actuated pattern-cylinder by connections with which the slides are operated, and means substantially as described for actuating the pattern-cylinder for the purpose set forth.

24. The combination, substantially as set forth, of two series of front widening-needles, the reciprocating cam-bars, mechanism, substantially as set forth, connected with the cam-bars, and by which these needles are thrown into and out of action, the intermittingly-actuated pattern-cylinder, mechanism, substantially as set forth, connected with the pattern-cylinder, by which the cam-bars are operated, the two series of back widening-needles, and the connecting mechanism, substantially as set forth, by means of which they are actuated by the pattern-cylinder, for the purpose described.

25. The combination, substantially as set forth of the cam-grooved main actuating-gear, the reciprocating yarn-carrier and its connected mechanism actuated by means of the cam-groove of the main actuating-gear, for the purpose described.

26. The combination, substantially as set forth of the reciprocating main cam-slides, needle-actuating cams carried thereby, the cam-grooved main actuating-gear, connecting mechanism by which the main cam-slides are actuated from the main actuating-gear, the reciprocating yarn-carrier and its connected mechanism actuated by means of the cam-groove of the main actuating-gear, for the purpose described.

In testimony whereof I have hereunto subscribed my name.

ALFRED NELSON,
*Administrator of the estate of John Nelson, deceased.*

Witnesses:
S. G. BRONSON,
HIRAM D. EASTMAN.